(12) United States Patent
Xue et al.

(10) Patent No.: US 8,676,210 B2
(45) Date of Patent: Mar. 18, 2014

(54) HANDLING OF EVENT TRIGGER REGISTRATIONS ON BBERF DURING HAND-OVER

(75) Inventors: Xiong Xue, Kanata (CA); Shanawaz Shaik, Ottawa (CA); Mike Vihtari, Ottawa (CA)

(73) Assignee: Alcatel Lucent, Paris (FR)

( * ) Notice: Subject to any disclaimer, the term of this patent is extended or adjusted under 35 U.S.C. 154(b) by 0 days.

(21) Appl. No.: 13/413,205

(22) Filed: Mar. 6, 2012

(65) Prior Publication Data

US 2013/0237232 A1 Sep. 12, 2013

(51) Int. Cl.
*H04W 36/38* (2009.01)

(52) U.S. Cl.
USPC ........... 455/439; 455/436; 455/445; 370/352; 370/351; 370/331

(58) Field of Classification Search
USPC .............. 5/445; 370/352, 359, 331, 338, 217, 370/355, 351; 379/221.08, 207.219, 243, 379/230, 209.01; 725/135; 707/E17.012, 707/999.103; 709/229; 455/445, 414.1, 455/436, 414.2, 439; 375/E7.024, 240.01
See application file for complete search history.

(56) References Cited

U.S. PATENT DOCUMENTS

| | | | |
|---|---|---|---|
| 2005/0111650 A1* | 5/2005 | Baratz et al. | 379/221.08 |
| 2006/0031436 A1* | 2/2006 | Sakata et al. | 709/221 |
| 2006/0031535 A1* | 2/2006 | Hackl et al. | 709/228 |
| 2007/0089161 A1* | 4/2007 | Waris | 726/1 |
| 2008/0146201 A1* | 6/2008 | O'Neill et al. | 455/414.1 |
| 2010/0043041 A1* | 2/2010 | Ford et al. | 725/111 |
| 2011/0131313 A1* | 6/2011 | Zhou et al. | 709/223 |
| 2011/0256873 A1* | 10/2011 | Vikberg et al. | 455/436 |
| 2012/0005356 A1* | 1/2012 | Hellgren | 709/229 |
| 2012/0106508 A1* | 5/2012 | Zhou et al. | 370/331 |

* cited by examiner

*Primary Examiner* — Mahendra Patel
(74) *Attorney, Agent, or Firm* — Kramer & Amado P.C.

(57) ABSTRACT

Various exemplary embodiments relate to a method performed by a policy and charging rules node of provisioning event triggers. The method may include: receiving, from a requesting node, a request to provision a set of event triggers on a primary gateway; forwarding, to the primary gateway, the set of event triggers; storing the set of event triggers in association with a session; detecting a handover of the session; determining a new primary gateway; and forwarding, to the new primary gateway, the set of event triggers. The method may further include: receiving a message; determining whether the message includes the same set of event triggers; if the message includes the same set of event triggers, refraining from sending the set of event triggers to the primary gateway; and if the message includes a different set of event triggers, forwarding the different set of event triggers to the primary gateway.

20 Claims, 5 Drawing Sheets

HANDLING OF EVENT TRIGGER REGISTRATIONS ON BBERF DURING HAND-OVER

TECHNICAL FIELD

Various exemplary embodiments disclosed herein relate generally to telecommunications networks.

BACKGROUND

As the demand increases for varying types of applications within mobile telecommunications networks, service providers must constantly upgrade their systems in order to reliably provide this expanded functionality. What was once a system designed simply for voice communication has grown into an all-purpose network access point, providing access to a myriad of applications including text messaging, multimedia streaming, and general Internet access. In order to support such applications, providers have built new networks on top of their existing voice networks, leading to a less-than-elegant solution. As seen in second and third generation networks, voice services must be carried over dedicated voice channels and directed toward a circuit-switched core, while other service communications are transmitted according to the Internet Protocol (IP) and directed toward a different, packet-switched core. This led to unique problems regarding application provision, metering and charging, and quality of experience (QoE) assurance.

In an effort to simplify the dual core approach of the second and third generations, the 3rd Generation Partnership Project (3GPP) has recommended a new network scheme it terms "Long Term Evolution" (LTE). In an LTE network, all communications are carried over an IP channel from user equipment (UE) to an all-IP core called the Evolved Packet Core (EPC). The EPC then provides gateway access to other networks while ensuring an acceptable QoE and charging a subscriber for their particular network activity.

The 3GPP generally describes the components of the EPC and their interactions with each other in a number of technical specifications. Specifically, 3GPP TS 29.212, 3GPP TS 29.213, and 3GPP TS 29.214 describe the Policy and Charging Rules Function (PCRF), Policy and Charging Enforcement Function (PCEF), and Bearer Binding and Event Reporting Function (BBERF) of the EPC. These specifications further provide some guidance as to how these elements interact in order to provide reliable data services and charge subscribers for use thereof.

SUMMARY

A brief summary of various exemplary embodiments is presented. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections.

Various exemplary embodiments relate to a method performed by a Policy and Charging Rules Node (PCRN) of provisioning event triggers. The method may include: receiving, from a requesting node, a request to provision a set of event triggers on a primary gateway; forwarding, to the primary gateway, the set of event triggers; storing the set of event triggers in association with a session; detecting a handover of the session; determining a new primary gateway; and forwarding, to the new primary gateway, the set of event triggers.

In various alternative embodiments, the method further includes: receiving a message from a network node; determining whether the message includes the same set of event triggers as the stored set of event triggers; if the message includes the same set of event triggers, refraining from sending the set of event triggers to the primary gateway; and if the message includes a different set of event triggers, forwarding the different set of event triggers to the primary gateway.

In various alternative embodiments, the step of detecting a handover of the session includes receiving a message from the new primary gateway. The method may further include: receiving a message from the requesting node; determining whether the message includes a different set of event triggers; determining whether the message indicates a primary gateway; and if the primary gateway is the same as the new primary gateway and the message includes the stored set of event triggers, refraining from sending a message to the new primary gateway.

In various alternative embodiments, the step of forwarding the set of event triggers includes sending the set of event triggers in a reply to the message from the new primary gateway.

In various alternative embodiments, the step of detecting a handover of the session includes receiving a message from the requesting node. The step of forwarding, to the new primary gateway, the set of event triggers may include sending a reauthorization request to the new primary gateway. The method may further include receiving a reply from the new primary gateway indicating that the event triggers have been installed.

In various alternative embodiments, the requesting node is a packet data network gateway or a policy control and enforcement node.

In various alternative embodiments, the step of storing the set of event triggers includes storing a bit mapping of event triggers.

Various exemplary embodiments relate to the above described method encoded on a tangible and non-transitory machine-readable storage medium as instructions for execution by a network element.

It should be apparent that, in this manner, various exemplary embodiments enable a method of handling event trigger registrations on a BBERF during handover. In particular, by saving the Event Registration Indication, the PCRN may ensure that the BBERF at the primary SGW is correctly provisioned with a set of event triggers requested by the PGW.

BRIEF DESCRIPTION OF THE DRAWINGS

In order to better understand various exemplary embodiments, reference is made to the accompanying drawings, wherein.

DETAILED DESCRIPTION

The 3GPP specifications, 3GPP TS 29.212 in particular, indicates that only the primary BBERF should be provisioned with event triggers. In the case of a handover, where the primary BBERF changes, the event triggers may be lost. A PGW or PCEF may request the event triggers to be provisioned on the new primary BBERF.

A PCRN is positioned so that it receives status updates from various network nodes including SGWs containing BBERFs. A PCRN may store a set of required event triggers when it provisions the primary BBERF. A PCRN may detect a handover and automatically provision the new primary BBERF with the stored set of required event triggers. The PCRN may reduce network messages by screening duplicate requests arriving from multiple nodes.

Referring now to the drawings, in which like numerals refer to like components or steps, there are disclosed broad aspects of various exemplary embodiments.

Figure 1:
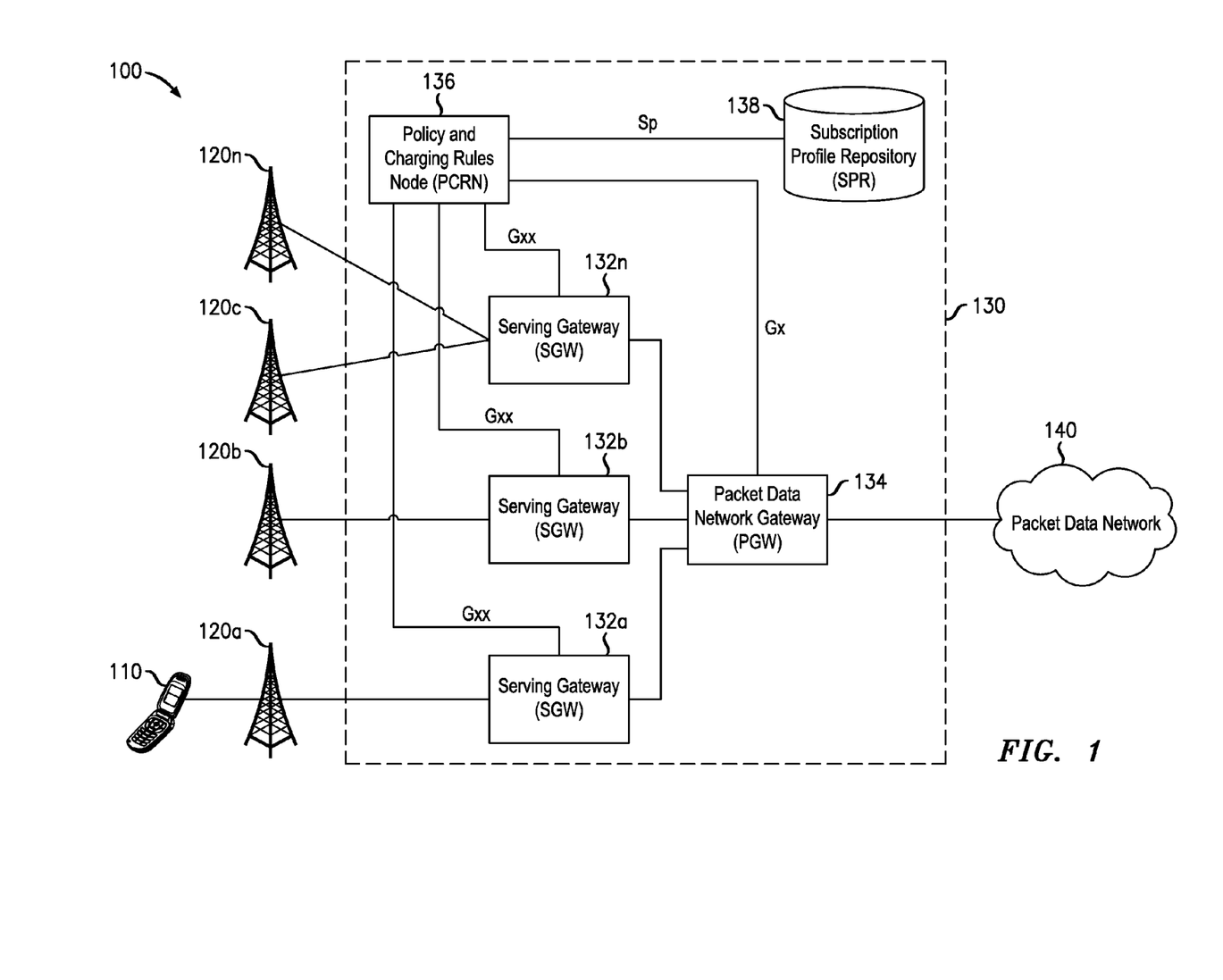
FIG. 1 illustrates an exemplary communications network.

FIG. 1 illustrates an exemplary subscriber network 100 for providing various data services. Exemplary subscriber network 100 may be a communications network, such as an LTE or 4G mobile communications network, for providing access to various services. In various exemplary embodiments, subscriber network 100 is a public land mobile network (PLMN). The subscriber network 100 may include user equipment 110, base stations 120, evolved packet core (EPC) 130, and packet data network 140.

User equipment 110 may be a device that communicates with packet data network 140 for providing an end-user with a data service. Such data service may include, for example, voice communication, text messaging, multimedia streaming, and Internet access. More specifically, in various exemplary embodiments, user equipment 110 is a personal or laptop computer, wireless email device, cell phone, television set-top box, or any other device capable of communicating with other devices via EPC 130.

A base station 120 may be a device that enables communication between user equipment 110 and EPC 130. For example, base station 120a may be a base transceiver station such as an evolved nodeB (eNodeB) as defined by 3GPP standards. Thus, base station 120a may be a device that communicates with user equipment 110 via a first medium, such as radio waves, and communicates with EPC 130 via a second medium, such as Ethernet cable. Base station 120a may be in direct communication with EPC 130 or may communicate via a number of intermediate nodes (not shown). Note that in various alternative embodiments, user equipment 110 may communicate directly with EPC 130. In such embodiments, base station 120 may not be present.

In various embodiments, multiple base stations 120a-n may be present to provide mobility to user equipment 110. Each base station 120a-n may have a limited range. As user equipment 110 approaches the limit of a base station's range, the signal may degrade. User equipment 110 may be handed over to a different base station to provide a better signal.

Evolved packet core (EPC) 130 may be a device or association of devices that provides user equipment 110 with gateway access to packet data network 140. EPC 130 may further charge a subscriber for use of provided data services and ensure that particular quality of experience (QoE) standards are met. Thus, EPC 130 may be implemented, at least in part, according to the 3GPP TS 29.212, 29.213, and 29.214 standards. Accordingly, EPC 130 may include a plurality serving gateways (SGW) 132a-n, a packet data network gateway (PGW) 134, a PCRN 136, and a subscription profile repository (SPR) 138.

A serving gateway (SGW) 132 may be a device that provides gateway access to the EPC 130 to an end user of network 100. SGW 132 may be one of the first devices within the EPC 130 that receives packets sent by user equipment 110.

Various embodiments may also include a mobility management entity (MME) (not shown). SGW 132 may perform a number of functions such as, for example, managing mobility of user equipment 110 between multiple base stations 120a-n and enforcing particular quality of service (QoS) characteristics for each flow being served.

In various exemplary embodiments, EPC 130 may include multiple SGWs 130a-n and each SGW may communicate with multiple base stations 120a-n. For example, SGW 132c is shown in communication with base stations 120c and 120n. Each IP-CAN session for a user equipment 110 may be associated with a primary SGW 132. The primary SGW 132 may be the SGW that is currently actually transmitting data to and from the user equipment 110. A handover may occur when the SGW servicing a user equipment 110 changes due to, for example, movement of the user equipment or congestion at the primary SGW 132. One of the other SGWs 132 may begin transmitting data to and from the user equipment 110.

In various implementations, such as those implementing the proxy mobile IP (PMIP) standard, SGW 132 may include a bearer binding and event reporting function (BBERF). The BBERF at a primary SGW 132 may maintain a set of event triggers. An event trigger may indicate an event that the SGW 132 should report to PCRN 136. SGW 132 may receive a set of event triggers for each IP-CAN session for which the SGW is the primary SGW. SGW 132 may monitor user sessions for the set of event triggers and send notification to PCRN 136 when an event occurs. In various alternative embodiments, more than one SGW may act as a primary SGW. In such embodiments, each primary SGW may receive a set of event triggers.

Packet data network gateway (PGW) 134 may be a device that provides gateway access to packet data network 140 to an end user of network 100. PGW 134 may be the final device within the EPC 130 that receives packets sent by user equipment 110 toward packet data network 140 via SGW 132. PGW 134 may include a policy and charging enforcement function (PCEF) that enforces policy and charging control (PCC) rules for each service data flow (SDF). Therefore, PGW 134 may be a policy and charging enforcement node (PCEN). PGW 134 may include a number of additional features such as, for example, packet filtering, deep packet inspection, and subscriber charging support.

PGW 134 may acquire information about the access network for making decisions using event triggers. In particular, PGW 134 may request information regarding an SGW by requesting event triggers to be provisioned on the SGW. PGW 134 may request PCRN 136 to provision an event trigger at the SGW 132 and notify PGW 134 when the event occurs. PGW 134 may send PCRN 136 an event report indication (ERI) that indicates a set of event triggers which SGW 132 should report to PGW 134 via PCRN 136, Policy and charging rules node (PCRN) 136 may make policy decisions based on network information. PCRN 136 may include a policy and charging rules function (PCRF) that generates PCC and/or QoS rules for implementing policy decisions. PCRN 136 may communicate with SGW 132 and PGW 134 via a Gxx and a Gx interface, respectively. PCRN 136 may generate and/or modify PCC rules to control how SGW 132 and PGW 134 treat subscriber traffic. PCRN 136 may provision SGW 132 and/or PGW 134 with event triggers for desired event information. PCRN 136 may provision an SGW 132 with event triggers requested by both PGW 134 and PCRN 136. PCRN 136 may also provision event triggers requested by an application function (not shown). PCRN 136 may maintain a record of the event triggers provisioned for each SGW and each IP-CAN session.

Subscription profile repository (SPR) 138 may be a device that stores information related to subscribers to the subscriber network 100. Thus, SPR 138 may include a machine-readable storage medium such as read-only memory (ROM), random-access memory (RAM), magnetic disk storage media, optical storage media, flash-memory devices, and/or similar storage media. SPR 138 may be a component of PCRN 136 or may constitute an independent node within EPC 130. Data stored by SPR 138 may include an identifier of each subscriber and indications of subscription information for each subscriber such as, for example, subscriber category, subscriber policies or plans, account balances, bandwidth limits, charging parameters, and subscriber priority. SPR 138 may also maintain a record of current subscriber usage according to one or more counters such as, for example, data volume (uplink, downlink, or total), time, or credits.

Packet data network 140 may be a network (e.g., the Internet or another network of communications devices) for providing data communications between user equipment 110 and other devices connected to packet data network 140. Packet data network 140 may further provide, for example, phone and/or Internet service to various user devices in communication with packet data network 140.

Figure 2:
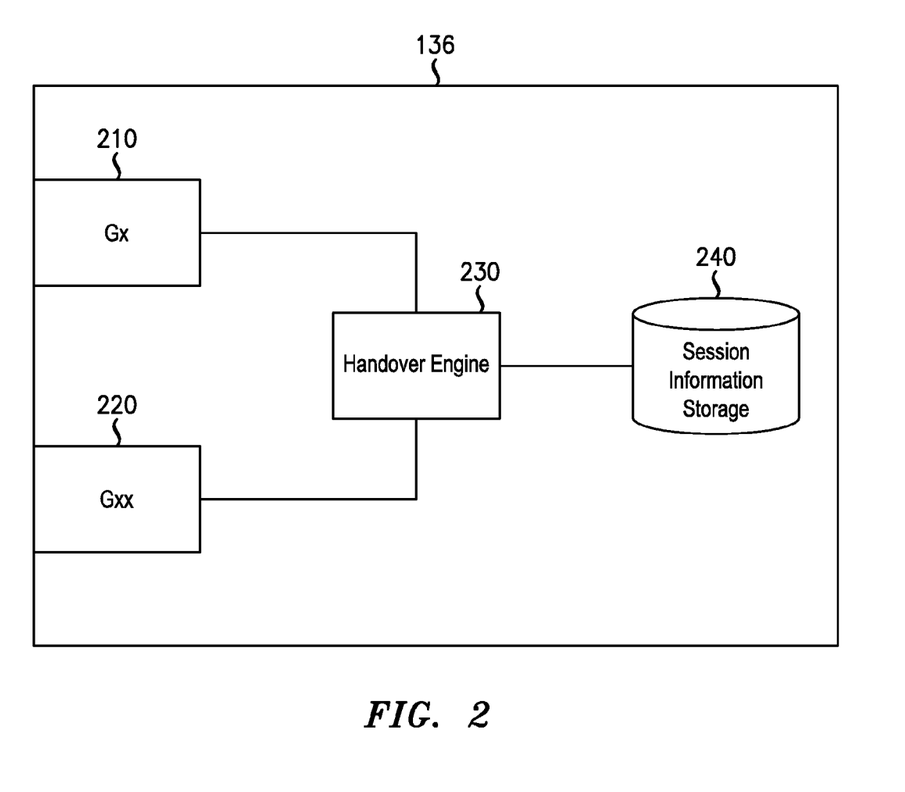
FIG. 2 illustrates an exemplary policy and charging rules node.

FIG. 2 illustrates an exemplary policy and charging rules node (PCRN) 136. PCRN 136 may include Gx interface 210, Gxx interface 220, handover engine 230, and session information storage 240.

Gx interface 210 may be an interface comprising hardware and/or executable instructions encoded on a machine-readable storage medium configured to communicate with a PGW such as PGW 134. Such communication may be implemented according to the 3GPP TS 29.212. Thus, Gx interface 210 may receive requests for PCC rules and transmit PCC rules for installation. Gx interface 210 may further receive session information including Event Report Indications (ERI). An ERI may be sent from PGW 134 in a session update request using a Credit Control Request (CCR) message including the Event-Report-Indication AVP. The Event-Report-Indication AVP may include any number of Event-Trigger AVPs. Gx interface 210 may send a Credit Control Answer (CCA) message in response to a CCR.

Gxx interface 220 may be an interface comprising hardware and/or executable instructions encoded on a machine-readable storage medium configured to communicate with an SGW such as SGWs 132. Such communication may be implemented according to the 3GPP TS 29.212. Thus, Gxx interface 220 may receive requests for QoS rules and transmit QoS rules for installation. Gxx interface 220 may further receive UE-originated application requests, session requests, and event notifications in the form of a CCR message. In the event of a handover, Gxx interface 220 may receive a CCR message from the new primary SGW 132. If the SGW 132 is a new SGW for the IP-CAN session, the CCR may initiate a new gateway control session. If the SGW 132 has already established a gateway control session, the CCR may update session information. When PCRN 136 receives a CCR indicating a handover, Gxx interface 220 may respond with a CCA including a set of event triggers.

Handover engine 230 may include hardware and/or executable instructions encoded on a machine-readable storage medium configured to determine when a handover occurs. Handover engine 230 may process messages received via Gx interface 210 and Gxx interface 220. Handover engine 230 may compare session identifiers and addresses included within the received messages to determine whether a handover has occurred. For example, if handover engine 230 receives a CCR message from a new SGW including a request for a new gateway control session, handover engine 230 may determine that the new SGW is new the primary SGW.

Handover engine 230 may determine a set of event triggers when it determines that there has been a handover. Handover engine 230 may access session information 240 to look up a set of event triggers provisioned for the previous primary gateway. The provisioned event triggers may include event triggers provisioned upon request from a PGW 134. Handover engine 230 may also determine whether PCRN 136 requires additional event triggers for the SGW 132. Handover engine 230 may then use Gxx interface 220 to send a message including the event triggers to the SGW 132. The message may include an Event-Trigger AVP.

Session information storage 240 may include any machine-readable medium capable of storing session information for PCRN 136. Accordingly, session information storage 240 may include a machine-readable storage medium such as read-only memory (ROM), random-access memory (RAM), magnetic disk storage media, optical storage media, flash-memory devices, and/or similar storage media. Session information storage 240 may store information related to subscriber sessions. In particular, session information storage 240 may store session identifiers and addresses linking various sessions of the same subscriber such as gateway control sessions, Gx sessions, and IP-CAN sessions. Handover engine 230 may access this information to determine when a handover occurs and which SGW is the primary gateway. Session information storage 240 may also store a set of event triggers provisioned on the primary gateway for each IP-CAN session. The set of event triggers may be efficiently stored in a bit mapping of each individual event trigger to a single bit. Handover engine 230 may access the stored set of event triggers during a handover in order to provision the new primary gateway with the event triggers of the previous primary gateway.

Figure 3:
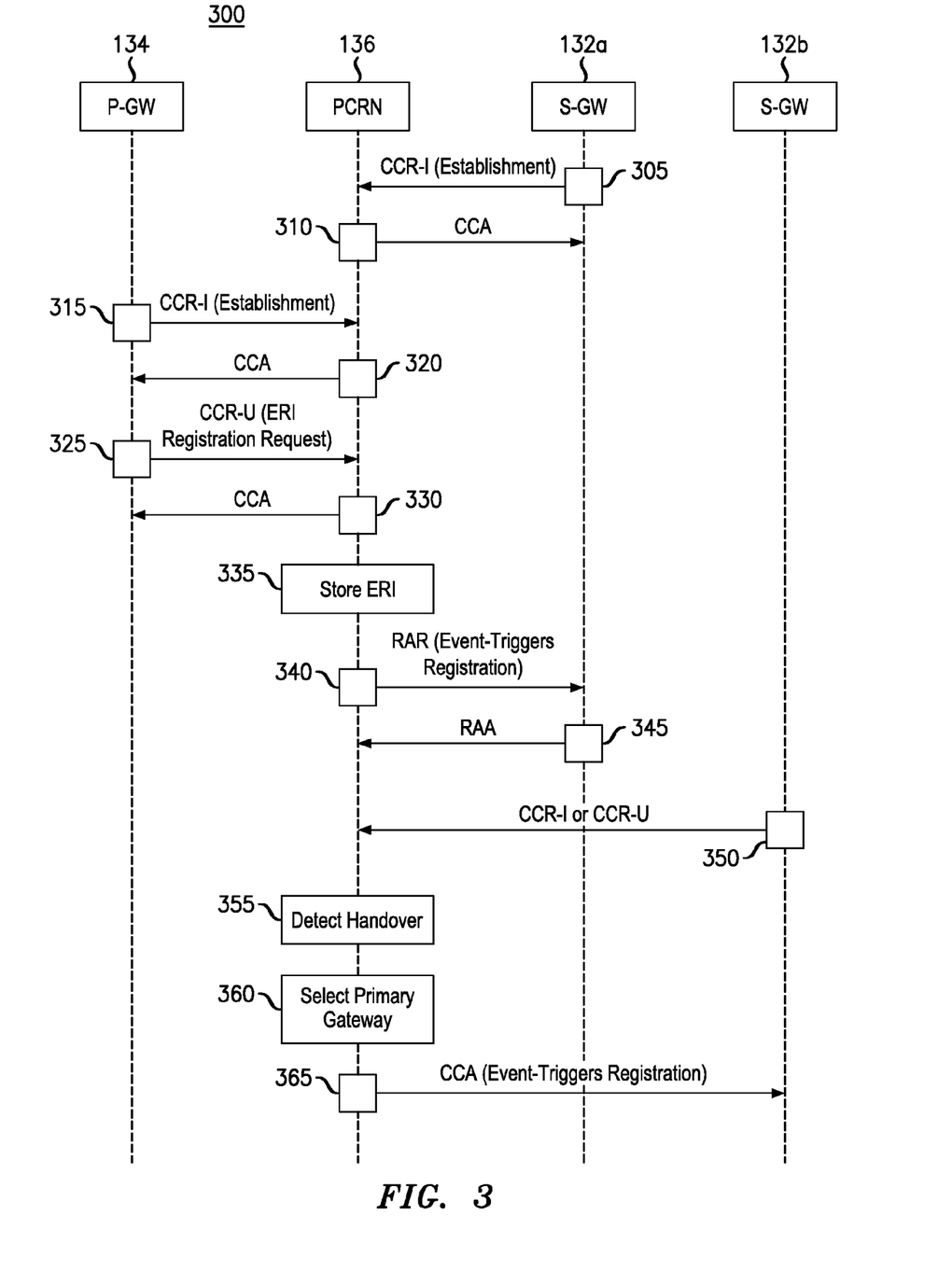
FIG. 3 illustrates a message passing diagram showing an exemplary method of processing a handover.

FIG. 3 illustrates a message passing diagram showing an exemplary method 300 of processing a handover. Exemplary method 300 may be performed by the various nodes of communications network 100 such as, for example, PGW 134, PCRN 136, SGW 132a, and SGW 132b. Some steps are shown as a message sent between nodes. It should be apparent that such a step may involve a step of sending the message and a step of receiving the message. Method 300 may begin at step 305.

In step 305, a first SGW 132a may send a CCR message to initiate a gateway control session with the PCRN 136. In step 310, PCRN 136 may send a CCA message to SGW 132a acknowledging the session request and providing session information, such as, for example QoS rules for the session.

In step 315, PGW 134 may send a CCR message to initiate a gateway control session with the PCRN 136. In step 320, PCRN 136 may send a CCA message to PGW 134 acknowledging the session request and providing session information, such as, for example, PCC rules for the session. In various exemplary embodiments, steps 305 and 315 may occur in the other order. In either case, PCRN 136 may link the sessions in association with the same subscriber or same IP-CAN session.

In step 325 PGW 134 may send a CCR update message including an ERI requesting a set of event triggers to be provisioned to SGW 132a. In various exemplary embodiments, PGW 134 must include the ERI as a separate update request without any other updates to the Gx session. In various alternative embodiments, PGW 134 may send the ERI in the establishment request of step 315, in which case, steps 325 and 330 may be skipped. In step 330, PCRN 136 may send a CCA message to PGW 134 acknowledging the received ERI registration request. In step 335, PCRN 136 may store the received ERI, for example, in session information storage 240.

In step 340, PCRN 136 may send a set of event triggers to SGW 132a. The set of event triggers may include those present in the ERI and additional event triggers required by PCRN 136 and/or an application function. SGW 132a may install the event triggers and begin monitoring for the designated events. In step 345, SGW 132a may send an RAA message to acknowledge receipt of the event triggers. At this point, communications network 100 may be properly processing an IP-CAN session between user equipment 110 and data packet network 140. If a subscribed event occurs at SGW 132a, it may be reported to PCRN 136 and PGW 134 for processing.

In step 350, PCRN 136 may receive a CCR message from another SGW such as, for example, SGW 132b. The CCR message may request a new gateway control session or may request an update of an existing gateway control session for a non-primary SGW. In step 355, PCRN 136 may determine whether the received CCR message indicates a handover. PCRN 136 may compare session identifiers and addresses to determine whether the received CCR message indicates a handover. In step 360, PCRN 136 may select a primary gateway. The primary gateway may be chosen from among SGWs 132 with a gateway control session for the subscriber or IP-CAN session. PCRN 136 may select the primary gateway according to session characteristics such as IP-CAN type and most recent session. In various exemplary embodiments, it is likely that the SGW 132b sending a CCR message will be selected as the new primary gateway.

In step 365, PCRN 136 may send a CCA message to SGW 132b including a set of event triggers. The set of event triggers may be the same set of event triggers that was provisioned on the old primary SGW. PCRN 136 may retrieve the saved ERI and other event triggers from session information storage 140 and include it in the CCA message. In various exemplary embodiments, PCRN 136 may generate the CCA including the ERI event triggers without receiving additional input from PGW 134. Once the new primary gateway has been provisioned with a set of event triggers, the method 300 may end. Alternatively, method 300 may return to step 345, and PCRN 136 may wait for an indication of a handover.

Figure 4:
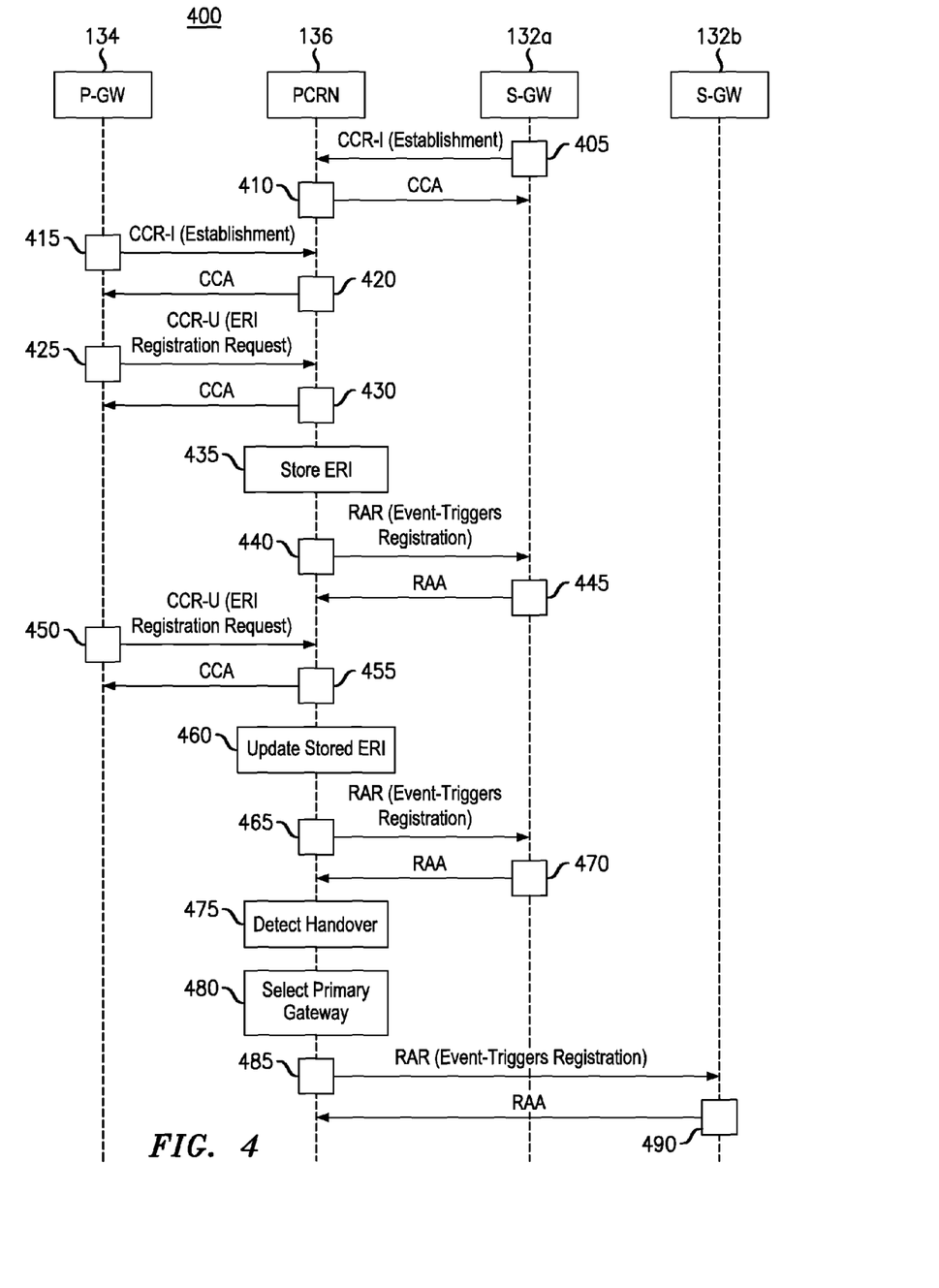
FIG. 4 illustrates a message passing diagram showing another exemplary method of processing a handover.

FIG. 4 illustrates a message passing diagram showing another exemplary method 400 of processing a handover. Exemplary method 400 may be performed by the various nodes of communications network 100 such as, for example, PGW 134, PCRN 136, SGW 132a, and SGW 132b. Some steps are shown as a message sent between nodes. It should be apparent that such a step may involve a step of sending the message and a step of receiving the message. Method 400 may be similar to method 300 through step 445. Steps 405 through 445 may correspond to steps 305 through 345. After step 445, communications network 100 may be properly managing a subscriber's IP-CAN session with event triggers provisioned at the primary SGW 132a.

In step 450, PGW 134 may send a CCR update message. The CCR update message may include an event trigger AVP such as IP-CAN_CHANGE or AN_GW_CHANGE that indicates that PGW 134 has detected a change in the SGW. In various embodiments, the CCR update message may also include an ERI. If the CCR update message does not include an ERI, steps 460, 465, and 470 may be skipped. In various alternative embodiments, PGW 134 may send a second CCR message including an ERI. In step 455, PCRN 136 may send a CCA message to PGW 134 acknowledging the CCR message.

If PCRN 136 receives an ERI from PGW 133, in step 460, PCRN 136 may update the stored ERI with the ERI received from PGW 134. In step 465, PCRN 136 may send a set of event triggers including those in the received ERI to the current primary SGW 132a. In step 470, current primary SGW 132a may respond with an RAA acknowledging receipt of the set of event triggers.

In step 475, PCRN 136 may determine whether the CCR message indicates a handover. PCRN 136 may compare session identifiers and addresses to determine whether the received CCR message indicates a handover. In step 480, PCRN 136 may select a primary gateway. The primary gateway may be chosen from among SGWs 132 with a gateway control session for the subscriber or IP-CAN session. The primary gateway may be chosen according to IP-CAN type or most recent session.

In step 485, PCRN 136 may push a set of event triggers to the new primary gateway SGW 132b using an RAR message. In various exemplary embodiments, PCRN 136 may send the RAR message without input from new primary SGW 132b. PCRN 136 may include event triggers from either a saved ERI or a new ERI received in step 450. In step 490, the new primary gateway SGW 132b may send an RAA message acknowledging receipt of the set of event triggers. Once the new primary gateway has been provisioned with a set of event triggers, the method 400 may end. Alternatively, method 400 may return to step 445, and PCRN 136 may wait for an indication of a handover.

Figure 5:
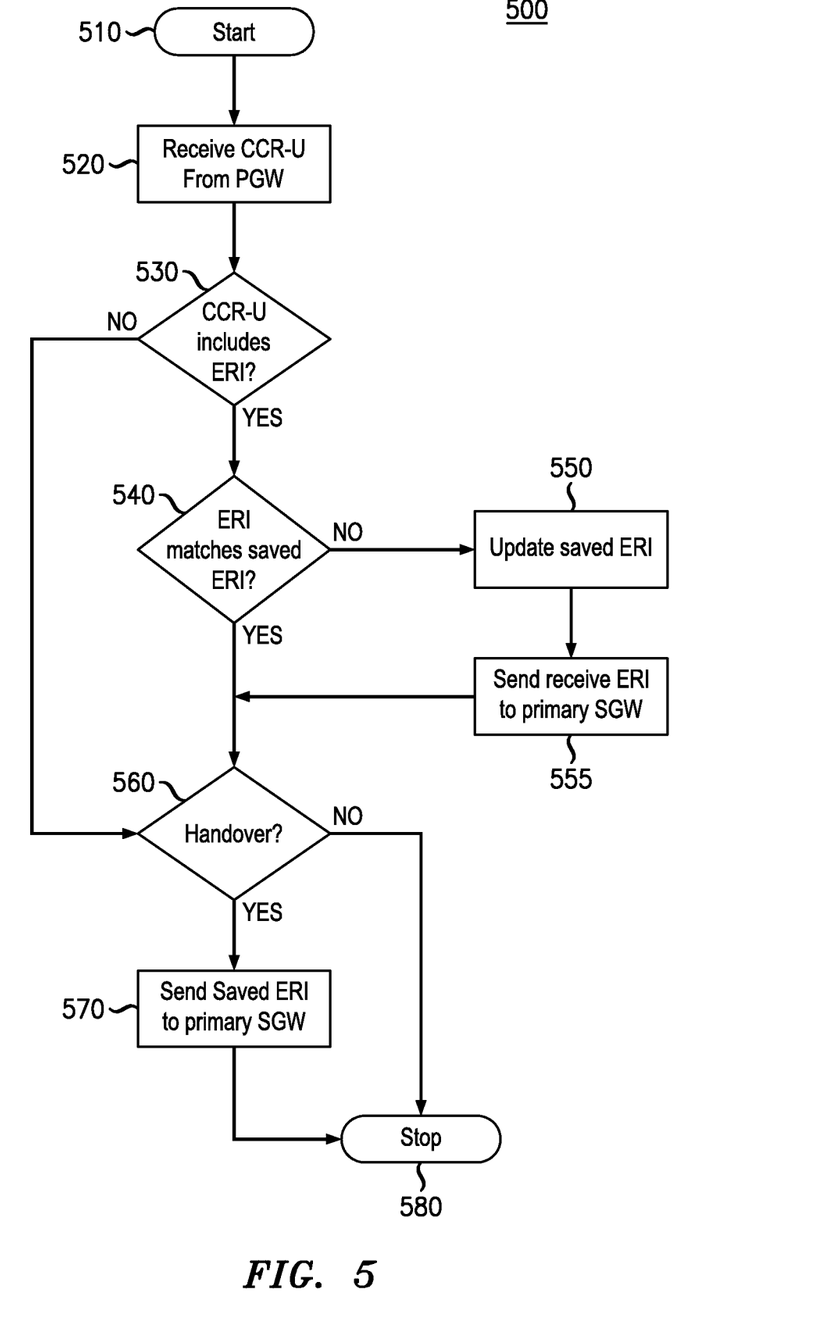
FIG. 5 illustrates a flowchart showing an exemplary method of processing a session update from a PGW.

FIG. 5 illustrates a flowchart showing an exemplary method 500 of processing a session update from a PGW 134. Method 500 may be performed by the various components of PCRN 136. Method 500 may begin at step 510 and proceed to step 520.

In step 520, PCRN 136 may receive a CCR update message from PGW 134. Because PCRN 136 may receive a CCR update message from PGW 134 at different times and under different conditions, PCRN 136 may determine how to process the CCR update message. The method 500 may proceed to step 530.

In step 530, PCRN 136 may determine whether the received CCR update message includes an ERI. PCRN 136 may simply check to determine whether a Event-Report-Indication AVP is present in the received CCR. If the CCR includes an ERI, the method 500 may proceed to step 540. If the CCR does not include an ERI, the method 500 may proceed to step 560.

In step 540, PCRN 136 may determine whether the ERI matches the saved ERI for the subscriber or IP-CAN session. If the received ERI is identical to the saved ERI, the method 500 may proceed to step 560. If the received ERI is different than the saved ERI, the method 500 may proceed to step 550.

In step 550, PCRN 136 may update the ERI stored in session information storage 240 with the received ERI. In step 555, PCRN 136 may send the received ERI to the primary SGW in a set of event triggers. PCRN 136 may determine the primary SGW based on the content of the received CCR. In various exemplary embodiments, PCRN 136 may use a RAR message to send the ERI. The method 500 may then proceed to step 560.

In step 560, PCRN 136 may determine whether the received CCR message indicates a handover. For example, PCRN 136 may determine whether the received CCR message includes a notification of change in the SGW address or a change in the IP-CAN session. If the CCR message does not indicate a handover, PCRN 136 may refrain from sending a message to SGW 132 and the method 500 may proceed to step 580, where the method ends. If the CCR does indicate a handover, the method 500 may proceed to step 570.

In step 570, PCRN 136 may send the saved ERI to the primary gateway. PCRN 136 may determine the new primary gateway based on the contents of the received CCR. PCRN 136 may send the saved ERI using a RAR message. PCRN 136 may also uninstall the ERI at the former primary SGW. The method 500 may then proceed to step 580, where the method ends.

According to the foregoing, various exemplary embodiments provide for a method of handling event trigger registrations on a BBERF during handover. In particular, by saving the Event Registration Indication, the PCRN may ensure that the BBERF at the primary SGW is correctly provisioned with a set of event triggers requested by the PGW.

It should be apparent from the foregoing description that various exemplary embodiments of the invention may be implemented in hardware and/or firmware. Furthermore, various exemplary embodiments may be implemented as instructions stored on a machine-readable storage medium, which may be read and executed by at least one processor to perform the operations described in detail herein. A machine-readable storage medium may include any mechanism for storing information in a form readable by a machine, such as a personal or laptop computer, a server, or other computing device. Thus, a machine-readable storage medium may include read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principals of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the invention, which is defined only by the claims.

What is claimed is:

1. A method performed by a policy and charging rules node (PCRN) of provisioning event triggers from a requesting node on a primary gateway, the method comprising:
   receiving, from the requesting node, a request to provision a set of event triggers on a first primary gateway providing a communication session;
   forwarding, to the first primary gateway, the received set of event triggers indicating events that the primary gateway should report to the PCRN when an event matching one of the event triggers occurs at the first primary gateway;
   storing the received set of event triggers in association with the session;
   detecting a handover of the session;
   determining a new primary gateway; and
   provisioning the new primary gateway by forwarding, to the new primary gateway, the stored set of event triggers after detecting the handover.

2. The method of claim 1, further comprising:
   receiving a message from a network node;
   determining whether the message includes the same set of event triggers as the stored set of event triggers;
   if the message includes the same set of event triggers, refraining from sending the set of event triggers to the primary gateway; and
   if the message includes a different set of event triggers, forwarding the different set of event triggers to the primary gateway.

3. The method of claim 1, wherein the step of detecting a handover of the session comprises receiving a message from the new primary gateway.

4. The method of claim 3, further comprising:
   receiving a message from the requesting node;
   determining whether the message includes a different set of event triggers;
   determining whether the message indicates a primary gateway; and
   if the primary gateway is the same as the new primary gateway and the message includes the stored set of event triggers, refraining from sending a message to the new primary gateway.

5. The method of claim 3, wherein the step of forwarding the set of event triggers comprises sending the set of event triggers in a reply to the message.

6. The method of claim 1, wherein the step of detecting a handover of the session comprises receiving a message from the requesting node.

7. The method of claim 6, wherein the step of forwarding, to the new primary gateway, the set of event triggers comprises sending a reauthorization request to the new primary gateway.

8. The method of claim 7, further comprising, receiving a reply from the new primary gateway indicating that the event triggers have been installed.

9. The method of claim 1, wherein the requesting node is a packet data network gateway or a policy charging and enforcement node.

10. The method of claim 1, wherein the step of storing the set of event triggers comprises storing a bit mapping of event triggers.

11. A tangible and non-transitory machine-readable storage medium encoded with instructions thereon for execution by a network element of a telecommunication network to provision event triggers from a requesting node on a primary gateway, wherein said tangible and non-transitory machine-readable storage medium comprises:
   instructions for receiving, from a requesting node, a request to provision a set of event triggers on a first primary gateway providing a communication session;
   instructions for forwarding, to the first primary gateway, the received set of event triggers indicating events that the primary gateway should report to the network element when an event matching one of the event triggers occurs at the first primary gateway;
   instructions for storing the received set of event triggers in association with the session;
   instructions for detecting a handover of the session;
   instructions for determining a new primary gateway; and
   instructions for provisioning the new primary gateway by forwarding, to the new primary gateway, the stored set of event triggers after detecting the handover.

12. The machine-readable storage medium of claim 11, further comprising:
   instructions for receiving a message from a network node;

instructions for determining whether the message includes the same set of event triggers as the stored set of event triggers;

instructions for refraining from sending the set of event triggers to the primary gateway if the message includes the same set of event triggers; and instructions for forwarding the different set of event triggers to the primary gateway if the message includes a different set of event triggers.

13. The machine-readable storage medium of claim 11, wherein the instructions for detecting a handover of the session comprise instructions for receiving a message from the new primary gateway.

14. The machine-readable storage medium of claim 13, further comprising:

instructions for receiving a message from the requesting node;

instructions for determining whether the message includes a different set of event triggers;

instructions for determining whether the message indicates a primary gateway; and instructions for refraining from sending a message to the new primary gateway if the primary gateway is the same as the new primary gateway and the message includes the stored set of event triggers.

15. The machine-readable storage medium of claim 13, wherein the instructions for forwarding the set of event triggers comprise instructions for sending the set of event triggers in a reply to the message.

16. The machine-readable storage medium of claim 11, wherein the instructions for detecting a handover of the session comprise instructions for receiving a message from the requesting node.

17. The machine-readable storage medium of claim 16, wherein the instructions for forwarding, to the new primary gateway, the set of event triggers comprise instructions for sending a reauthorization request to the new primary gateway.

18. The machine-readable storage medium of claim 17, further comprising, instructions for receiving a reply from the new primary gateway indicating that the event triggers have been installed.

19. The machine-readable storage medium of claim 11, wherein the requesting node is a packet data network gateway or a policy charging and enforcement node.

20. The machine-readable storage medium of claim 11, wherein the instructions for storing the set of event triggers comprise instructions for storing a bit mapping of event triggers.

* * * * *